United States Patent [19]

Himes

[11] 4,117,037

[45] Sep. 26, 1978

[54] BLOCK COPOLYMER COMPOSITIONS

[75] Inventor: Glenn R. Himes, Houston, Tex.

[73] Assignee: Shell Oil Company, Houston, Tex.

[21] Appl. No.: 892,010

[22] Filed: Mar. 30, 1978

Related U.S. Application Data

[62] Division of Ser. No. 762,598, Jan. 26, 1977.

[51] Int. Cl.$^2$ ............................................. C08F 297/04
[52] U.S. Cl. ............................ 260/880 B; 260/876 B
[58] Field of Search ......................... 260/876 B, 880 B

[56] References Cited

U.S. PATENT DOCUMENTS

| | | | |
|---|---|---|---|
| 3,135,716 | 6/1964 | Uraneck | 260/79 |
| 3,468,972 | 9/1969 | Hsieh | 526/50 |
| 3,595,941 | 7/1971 | Farrar | 260/880 B |
| 3,614,836 | 10/1971 | Synder | 260/33.6 AQ |
| 3,637,554 | 1/1972 | Childers | 260/876 B |
| 3,639,517 | 2/1972 | Kitchen | 260/880 B |
| 3,873,645 | 3/1975 | Muirhead | 260/876 B |
| 3,906,058 | 9/1975 | Durst | 260/876 B |

*Primary Examiner*—Paul R. Michl
*Attorney, Agent, or Firm*—Dean F. Vance

[57] ABSTRACT

Block copolymer compositions having improved adhesion to porous substrates are prepared by employing an anionic polyarene as a component instead of a free radical polymerized polyarene. Also disclosed is a process for simultaneously preparing the block copolymer and anionic polyarene.

4 Claims, No Drawings

BLOCK COPOLYMER COMPOSITIONS

This is a division of application Ser. No. 762,598, filed Jan. 26, 1977.

BACKGROUND OF THE INVENTION

The use of certain block copolymers and their compounds in a number of end-uses and especially in footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, innersoles and the like. These compositions are disclosed in Hendricks et al, U.S. Reissue No. 28,236. In general, those shoe component compositions usually comprise a mixture of block copolymer, extending oil, polystyrene and possibly a filler. Many other en-duses of block copolymers are known, such as in pharmaceutical applications, sportswear and other artifacts. For the most part, these block copolymers have proved to be particularly advantageous in many respects, including flexibility, processability, lack of vulcanization requirement and wet slip. However, in certain respects, shortcomings have been noted. For example, commercial compounds should be free from delamination, free from elephant hide, and free from flow markings and marring. With respect to footwear, one of the major shortcomings of the block copolymer compounds such as those referred to in U.S. Re. No. 28,236 is the lack of adhesion of the compounds to the shoe upper. A new composition has been found that greatly improves the adhesive characteristics of the block copolymer compound.

SUMMARY OF THE INVENTION

The present invention is a composition suitable for footwear applications comprising:

| | Parts by Weight |
|---|---|
| (a) a block copolymer having at least two monoalkenyl arene polymer blocks A and at least one elastomeric conjugated diene block B, said blocks A comprising 8-65% by weight of the copolymer; | 100 |
| (b) a polyarene produced by the anionic polymerization of a monoalkenyl arene; | 5-125 |
| (c) a hydrocarbon rubber extending oil; and | 5-175 |
| (d) a finely divided filler. | 0-120 |

Shoe soles made according to the above formulation exhibit improved adhesion to shoe uppers in addition to improved mold cycle time, reduced marring, and improved cut growth.

In a further embodiment, it is preferred that the ratio of the number average molecular weight of the polyarene divided by the number average molecular weight of the A block of the block copolymer be between about 0.6 and about 2.0, preferably between about 0.8 and about 1.5. As shown in the following embodiments, when the molecular weights of polyarene and the A blocks are about equal, the adhesive characteristics of the blend are greatly improved. While the exact reason for this surprising improvement is not known, it is likely that these matching molecular weights result in improved compatibility of the polymers and reduced chances for segregation of polyarene particles on the surface of the blend.

Further, it is also preferred that the Q value of the polyarene, defined as the ratio of the weight average molecular weight over the number average molecular weight be between about 1.0 and about 3.0, preferably between about 1.0 and 2.0. The Q value for most crystal grade thermal polystyrene produced by the typical free-radical process is over about 5.0.

Also disclosed is a process for simultaneously forming the block copolymers and anionic polystyrene components employed in the composition which process comprises:

(a) polymerizing a monoalkenyl arene in a solvent and in the presence of a lithium alkyl initiator to form a living precursor polymer of the arene;

(b) adding less than the stoichiometric amount of terminating agent required to terminate all lithium ions wherein at least a portion of the remaining precursor arene polymer blocks contains living lithium ions, therein forming terminated block polymers of anionic polyarenes;

(c) polymerizing a conjugated diene in the presence of the remaining living precursor arene blocks therein forming a living two block polymer;

(d) contacting said living two block polymer with a coupling agent therein forming a coupled block copolymer; and (e) recovering the coupled block copolymer and the anionic polyarene blocks.

When the block copolymer and the anionic polyarene are prepared simultaneously there are a number of advantages. For one, the molecular weights of the polyarene blocks in the block copolymer and the anionic polyarene homopolymer are similar. In addition, the two components are recovered from the solution together and the usual problem of obtaining uniform mixing of the polyarene and block copolymer is eliminated.

DETAILED DESCRIPTION OF THE INVENTION

The block copolymers employed in the present composition are thermoplastic elastomers and have at least two monoalkenyl arene polymer end blocks A and at least one elastomeric conjugated diene polymer mid block B. The number of blocks in the block copolymer is not of special importance and the macromolecular configuration may be linear, graft or radial (branched) depending upon the method by which the block copolymer is formed. Much preferred is a radial block copolymer. Typical block copolymers of the most simple configuration would have the structure polystyrene-polyisoprene-polystyrene and polystyrene-polybutadiene-polystyrene. A typical radial polymer would comprise one in which the diene block has three or more branches, the tip of each branch being connected to a polystyrene block. See U.S. Pat. No. 3,594,452. Expressed another way, the invention also contemplates (but is not limited to) the use of configurations such as A-B-(B-A)$_n$ where $n$ varies from 1 to 15. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene.

The average molecular weights of each of the blocks may be varied as desired. The monoalkenyl arene polymer blocks preferably have number average molecular weights between about 5,000 and about 125,000, more preferably between about 15,000 and about 100,000. The elastomeric conjugated diene polymer blocks preferably have number average molecular weights between about 15,000 and about 250,000, more preferably between about 25,000 and about 150,000. The average molecular weights of the polystyrene end blocks are determined by gel permeation chromotography, whereas the polystyrene content of the polymer is measured by infrared spectroscopy of the finished block polymer. The weight percentage of the thermoplastic monoalkenyl arene blocks in the finished block polymer should be between about 8 and 65%, preferably between about 30% and about 50% by weight. The general type and preparation of these block copolymers are described in U.S. Re. 28,246 and in many other U.S. and foreign patents.

The block copolymers useful in the compositions of this invention may also be hydrogenated either selectively, randomly or completely. Selected conditions may be employed, for example, to hydrogenate the elastomeric diene center block while not so modifying the monoalkenyl arene polymer blocks. Two examples of hydrogenated polymers are polyvinylcyclohexane-hydrogenated polyisoprene-polyvinylcyclohexane and polystyrene-hydrogenated polybutadiene-polystyrene. Preferably, blocks A are characterized in that no more than about 25% of the original aromatic double bonds are reduced by hydrogenation while blocks B are characterized by having at least 75% of the aliphatic double bonds reduced by hydrogenation. See generally U.S. Pat. No. 3,595,942.

The polystyrene commonly employed in prior art formulations for footwear is typically termed "crystal grade polystyrene". This prior art crystal grade polystyrene is commercially produced almost exclusively by free radical polymerization. See Teach, Kiessling, Polystyrene, Reinhold Publishing Corp., page 38 (1960). The catalyst employed in the free radical polymerization step is usually an organic peroxide. The present invention employs a homopolymer of a monoalkenyl arene prepared by solution polymerization or mass polymerization with an organomonolithium initiator.

A method for producing the anionic polyarene by a mass polymerization process in the absence of solvent is disclosed in U.S. Pat. No. 3,790,547. However, the preferred method for producing the anionic polyarene is by a solution polymerization process similar to that employed in making the block copolymers of the instant invention.

A much preferred method for producing the anionic polyarene is to simultaneously manufacture the polyarene and the block copolymer. The first step of this process involves contacting the monoalkenyl arene and the organomonolithium compound (initiator) in the presence of an inert diluent therein forming a living polymer compound having the simplified structure A-Li. The monoalkenyl arene is preferably styrene. Other useful monoalkenyl arenes from which the thermoplastic (non-elastomeric) blocks may be formed include alphamethyl styrene, tert-butyl styrene and other ring alkylated styrenes as well as mixtures of the same. The inert diluent may be an aromatic or naphthenic hydrocarbon, e.g., benzene or cyclohexane, which may be modified by the presence of an alkene or alkane such as pentenes or pentanes. Specific examples of suitable diluents include n-pentane, n-hexane, isooctane, cyclohexane, toluene, benzene, xylene and the like. The organomonolithium compounds (initiators) that are reacted with the polymerizable additive in step one of this invention are represented by the formula RLi; wherein R is an aliphatic, cycloaliphatic, or aromatic radical, or combinations thereof, preferably containing from 2 to 20 carbon atoms per molecule. Exemplary of these organomonolithium compounds are ethyllithium, n-propyllithium, isopropyllithium, n-butyllithium, sec-butyllithium, tert-octyllithium, n-decyllithium, n-eicosyllithium, phenyllithium, 2-naphthyllithium, 4-butylphenyllithium, 4-tolyllithium, 4-phhenylbutyllithium, cyclohexyllithium, 3,5-di-n-hepthylcyclohexyllithium, 4-cyclopentylbutyllithium, and the like. The alkyllithium compounds are preferred for employment according to this invention, especially those wherein the alkyl group contains from 3 to 10 carbon atoms. A much preferred initiator is sec-butyllithium. See U.S. Pat. No. 3,231,635. The concentration of the initiator can be regulated to control molecular weight. Generally, the initiator concentration is in the range of about 0.25 to 50 millimoles per 100 grams of monomer although both higher and lower initiator levels can be used if desired. The required initiator level frequently depends upon the solubility of the initiator in the hydrocarbon diluent. These polymerization reactions are usually carried out at a temperature in the range of $-60$ to $+300°$ F. and at pressures which are sufficient to maintain the reaction mixture in the liquid phase.

In the next step, less than the stoichiometric amount of terminating agent required to remove all lithium radicals is added to the solution. This results in the formation of the anionic polyarene block polymers of the instant invention. There will remain in the solution, however, living polymer blocks of the structure A-Li. Typical terminating agents are water or alcohols.

Next, this living polymer in solution is contacted with a conjugated diene. Preferred dienes include butadiene and isoprene. The resulting living polymer has a simplified structure A-B-Li. It is at this point that the living polymer is coupled.

There are a wide variety of coupling agents that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, polyvinyl benzenes, and groups such as the combination of epoxy and aldehyde groups, isocyanate and halide groups, and the like. Various other substituents which are inert in the treating reaction can be present such as hydrocarbon radicals as exemplified by the alkyl, cycloalkyl, aryl, aralkyl, and alkaryl groups and the alkoxy, aryloxy, alkylthio, arylthio, and tertiary amino groups. Many suitable types of these polyfunctional compounds have been described in U.S. Pat. No. 3,595,941; U.S. Pat. No. 3,468,972; U.S. Pat. No. 3,135,716; U.S. Pat. No. 3,078,254; U.S. Pat. No. 3,985,830; and U.S. Pat. No. 3,594,452. When the coupling agent has two reactive sites such as dibromoethane, the polymer will have a linear ABA structure. When the coupling agent has three or more reactive sites, such as silicon tetrachloride, the polymer will have a branched structure, such as $(AB-)_nBA$. Divinyl benzene results in a star polymer having a large number of arms, e.g. 7-15 arms.

The typical coupling conditions include a temperature of between about 50° F. and about 170° F., and sufficient pressure to maintain the reactants in a liquid phase.

Instead of employing a coupling reaction, it is also within the scope of the instant invention to employ a sequential process, such as that disclosed in U.S. Pat. No. 3,231,635, to form a linear ABA-type polymer. In that case, instead of adding a coupling agent to an AB-Li living polymer, additional monoalkenyl arene monomer is added to the solution therein resulting in the formation of an ABA-Li polymer.

Following the coupling reaction or the completion of the sequential process, the product is neutralized such as by the addition of terminators, e.g. water, alcohol or other reagents, for the purpose of removing the lithium radical forming the nucleus for the condensed polymer product. The product is then recovered such as by coagulation utilizing hot water or steam or both. A typical recovery process is disclosed in U.S. Pat. No. 3,804,145.

The amount of anionic polyarene employed in the compositions of the instant invention varies from about 5-125 phr, preferably about 20-90 phr. The term "phr" is well known, and means parts by weight per 100 parts by weight rubber (or block copolymer as in the present case).

The hydrocarbon rubber extending oils, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oils include SHELLFLEX ® oils, No's. 310, 371 and 311 (which is a blend of 310 and 371). The amount of extending oil employed varies from about 5-175 phr preferably from about 50-125 phr.

Additional resins may also be employed in the present compositions. The additional resins employed herein are flow promoting resins that are compatible with the monoalkenyl end blocks of the block copolymer and include polymers of alphamethyl styrene, copolymers of alphamethyl styrene and vinyltoluene, coumarone-indene resins, polyindene resins, poly(methyl indene) resins and polystyrene resins of low molecular weight for flow promotion. The amount of end block compatible resin employed varies from about 0-150 phr, preferably 5-50 phr.

The fillers used in the present compositions are well known in the art and include clay, talc, silica, titanium dioxide, carbon blacks, calcium carbonate, and other pigments as well as fibrous fillers such as cellulosic fibers, sawdust, ground cork, etc. Preferred fillers include clay and calcium carbonate. The amount of filler employed varies from 0-250 phr, preferably 5-60 phr. Additional minor amounts of antioxidants, ultra-violet stabilizers and the like may also be added.

The components of this invention may be combined by processes known in the art including blending such as by extrusion, Banbury mixing or by dry-blending procedures. In the latter case, it is preferred that the block copolymer and polyarene be formed or ground in particles having an average size less than about 4 millimeter diameter onto which the extending oil is absorbed. Following this, the remaining powdered components may be added and vigorously dry-blended therewith such as in well-known dry-blending equipment long used in the PVC dry-blending art.

While the present specification emphasizes the use of these compositions in footwear components, other end-uses also are contemplated. These include for example, automative parts and wire and cable coatings. The present compositions, when utilized as coatings, result in wire and cable products which can be tightly bent or coiled without buckling of the coating. Tubular products such as hoses and the like also are contemplated.

The use of the present composition in footwear includes especially their use in soling when prepared by injection molding and slab soling, such as produced by cutting shoe sole forms from extruded slab-stock. The advantages of the present compositions are most apparent in injection molding of unit soles which are later attached by adhesion or sewing to uppers. In this situation, it has been found that the unit soles are readily removed from the injection mold and have reduced weld line formation on the surface. Furthermore, the sole so produced is resistant to delamination, has a relatively low abrasion loss, exhibits virtually no elephant hide, and has improved adhesion to the shoe upper. These unit soles (which term refers in the trade to a sole including an integral heel portion) are useful both as a leather replacement and as an improvement over the prior art vinyl soles. The compositions also may be used in the manufacture of injection molded canvas shoe soles wherein the soling is directly injection molded onto the canvas upper.

The invention is further illustrated by means of the following illustrative embodiment, which is given for the purpose of illustration along and is not meant to limit the invention to the particular reactants and amounts disclosed.

Illustrative Emodiment I

In Illustrative Embodiment I, various compositions were prepared using both crystal grade polystyrene and anionic polystyrene. In all compounds, the block copolymer was a styrene-butadiene branched block copolymer having polystyrene blocks with number average molecular weights of about 30,000. Also, in each compound, the extending oil was a paraffinic oil (SHELLFLEX ® 311) and the additive package included 0.6 parts KEMAMIDE E ® (an erucamide), 0.5 parts DLTDP (dilaurylthiodipropionate), 0.5 parts IRGANOX ® 1010 (antioxidant covered by U.S. Pat. Nos. 3,285,855 and 3,644,482), and 1.5 parts EPON ® 1004 resin (an epichlorohydrin/bisphenol A-type solid epoxy resin).

The crystal grade polystyrene was Amoco 303 TJ thermal produced polystyrene by a peroxide catalyzed free-radical process, and had a weight average molecular ($M_w$) of about 230,000 and a number average molecular weight ($M_n$) of about 48,000. Accordingly, the ratio of ($M_w/M_n$) = 5.2 = Q.

Various anionic polystyrenes were prepared by polymerizing styrene in a cyclohexane solvent with a sec-butyl lithium initiator. These polymers had varying number average molecular weight, and a Q value of about 1.1.

The individual components were mixed on a Banbury Mixer at about 300° F. for a total mix time of about 3 minutes.

Samples of the various compositions were tested according to the following tests:

| Test | Standard Test Number |
| --- | --- |
| Shore A Hardness | D-2240 |

-continued

| Test | Standard Test Number |
|---|---|
| Tinius Olsen Stiffness | D-747 |
| Taber Abrasion | D-1044 |
| Ross cut growth | D-1052 |
| Adhesive peel | Standard footwear test |
| Trouser tear | Standard footwear test |

In addition, the various compositions were used in the injection molding of unit soles in a unit sole mold attached to a Desma rotating table and injection molded by a Monopak molding machine. The pulling force required to remove the unit soles from the mold were noted for various composition.

The various formulations and test results are presented below in Table I.

Table I

| Composition, Parts By Weight | 1 | 2 | 3 | 4 | 5 |
|---|---|---|---|---|---|
| Block Copolymer | 100 | 100 | 100 | 100 | 100 |
| Extending Oil | 100 | 100 | 100 | 100 | 100 |
| Crystal Polystyrene | 55 | — | — | — | — |
| Anionic Polystyrene | — | 55 | 55 | 55 | 55 |
| Number average mol. wt. (m = 1000) | — | (10m) | (30m) | (41m) | (55m) |
| Additive Package | 4.1 | 4.1 | 4.1 | 4.1 | 4.1 |
| Total Parts | 259.1 | 259.1 | 259.1 | 259.1 | 259.1 |
| Specific Gravity | 0.953 | 0.953 | 0.954 | 0.954 | 0.954 |
| Test Results | | | | | |
| Shore A Hardness (compression molded) Instant /10 sec. | 48/45 | 80/76 | 60/55 | 52/48 | 48/45 |
| Shore A Hardness (injection molded) Instant /10 sec. | 67/62 | 90/85 | 82/76 | 74/68 | 69/63 |
| Taber Abrasion, cc loss/kc | 0.3175 | 0.3004 | 0.2682 | 0.2138 | 0.2077 |
| Tinius Olsen Stiffness, PSI | 1841 | 5000 | 4270 | 2607 | 1869 |
| Pulling Force during demolding, lbs | 9.4 | 10.3 | 5.8 | 5.3 | 5.1 |
| Adhesive Peel, PLI | 54 | 75 | 91 | 82 | 80 |
| Ross Flex Cut Growth, flexes to 500% growth | 300m | 310m | 750m | 860m | 730m |
| Trouser Tear, lbs per linear | 145/154 | 231/228 | 217/221 | 215/228 | 207/210 |

As can be seen above, compositions employing anionic polystyrene in place of crystal grade polystyrene exhibited markedly improved adhesion properties, better abrasion resistance, easier demolding and greater hardness and stiffness. In addition, the molded unit soles were more free of weld lines, had less elephant hide, showed no delamination tendencies and were more resistant to surface marring.

What is claimed is:

1. A process for simultaneously forming a block copolymer and an anionic polyarene, which comprises:
    (a) polymerizing a monoalkenyl arene in a solvent and in the presence of an organomonolithium initiator to form a living precursor polymer of the arene;
    (b) adding less than the stoichiometric amount of terminating agent required to terminate all lithium ions wherein at least a portion of the remaining precursor arene polymer blocks contain living ions; therein forming terminated block polymers of anionic polyarenes;
    (c) polymerizing a conjugated diene in the presence of the remaining living precursor arene blocks therein forming a living two block copolymer;
    (d) contacting said living two block copolymer with a coupling agent therein forming a coupled block copolymer; and
    (e) recovering the coupled block copolymer and the anionic polyarene block polymers.

2. A process for simultaneously forming a block copolymer and an anionic polyarene, which comprises:
    (a) polymerizing a monoalkenyl arene in a solvent and in the presence of an organomonolithium initiator to form a living precursor polymer of the arene;
    (b) adding less than the stoichiometric amount of terminating agent required to terminate all lithium ions wherein at least a portion of the remaining precursor arene polymer blocks contains living ions; therein forming terminated block polymers of anionic polyarenes;
    (c) polymerizing a conjugated diene in the presence of the remaining living precursor arene blocks therein forming a living two block copolymer;
    (d) polymerizing a monoalkenyl arene in the presence of the living two block copolymer therein forming a three block copolymer; and
    (e) recovering the three block copolymer and the anionic polyarene block polymer.

3. A process as in claim 1 wherein the monoalkenyl arene is styrene and the conjugated diene is selected from the group consisting of butadiene isoprene.

4. A process as in claim 3 wherein the solvent is cyclohexane, the organomonolithium initiator is sec-butyl lithium, and the coupling agent is dibromoethane.

* * * * *